United States Patent

Evens

[11] Patent Number: 5,374,920
[45] Date of Patent: Dec. 20, 1994

[54] DIRECTIONAL AND WARNING BLINK APPARATUS FOR A VEHICLE, PARTICULARLY A MOTOR VEHICLE

[75] Inventor: Hans-Josef Evens, Wadersloh, Germany

[73] Assignee: Hella KG Hueck & Co., Lippstadt, Germany

[21] Appl. No.: 975,691

[22] Filed: Nov. 13, 1992

[30] Foreign Application Priority Data

Nov. 15, 1991 [DE] Germany ............................ 4137611

[51] Int. Cl.⁵ ........................ B60Q 1/34; G08B 21/00
[52] U.S. Cl. ................................ 340/475; 340/458; 340/459; 340/641; 340/642
[58] Field of Search ............... 340/475, 458, 459, 641, 340/642

[56] References Cited

U.S. PATENT DOCUMENTS

| | | | |
|---|---|---|---|
| 3,165,716 | 1/1965 | Epstein | 340/468 |
| 4,105,996 | 8/1978 | Shimizu | 340/458 |
| 4,259,659 | 3/1981 | Ariyoshi et al. | 340/642 |
| 4,348,655 | 9/1982 | Goertler et al. | 340/458 |
| 4,349,810 | 9/1982 | Kugo et al. | 340/458 |
| 4,910,496 | 3/1990 | Hatanaka et al. | 340/458 |
| 4,972,174 | 11/1990 | Onan et al. | 340/642 |
| 5,072,210 | 12/1991 | Kimmelman | 340/458 |

FOREIGN PATENT DOCUMENTS

| | | |
|---|---|---|
| 0408821A1 | 1/1991 | European Pat. Off. . |
| 2153375 | 5/1973 | Germany . |
| 2920602 | 4/1980 | Germany . |
| 2927354 | 1/1981 | Germany . |
| 2944526 | 5/1981 | Germany . |
| 3034439A | 9/1982 | Germany . |
| 3335392 | 4/1985 | Germany . |
| 3630448 | 9/1987 | Germany . |
| 436761 | 7/1974 | U.S.S.R. . |

*Primary Examiner*—Donnie L. Crosland
*Attorney, Agent, or Firm*—Griffin Butler Whisenhunt & Kurtossy

[57] ABSTRACT

A directional and warning blink apparatus for a vehicle, particularly for a motor vehicle, comprises a directional warning blink sender (1) including a relay (12) with a driving circuit (5) therefor, a timing generator (4) and a control and logic circuit (3) for controlling timing operation of the timing generator. The control and logic circuit detects, via several input terminals, a chosen operational mode (warning blinking or directional blinking) as well as a blink signal lamp current and executes several control functions dependent upon these two items of information. An interior wiring of this directional warning blink sender can easily be adapted to various exterior wirings, in particular to varying numbers of blink signal lamps (26, 27).

21 Claims, 6 Drawing Sheets

DIRECTIONAL AND WARNING BLINK APPARATUS FOR A VEHICLE, PARTICULARLY A MOTOR VEHICLE

BACKGROUND OF THE INVENTION

The invention relates to a directional and warning blink apparatus for a vehicle, in particular a motor vehicle, comprising two groups of blink signal lamps, a directional blink switch for selecting a blink signal lamp group, a warning blink switch for combined switching of both blink signal lamp groups, a directional warning blink sender including a relay for controlling the blink signal lamps, a timing generator for producing timing signals, a driving circuit for controlling the relay as a function of the timing signals of the timing generator, and a control and logic circuit having a measuring input terminal to which is applied a voltage signal proportionate to a blink signal lamp current and controlling the timing operation of the timing generator depending upon the voltage signal.

Such an apparatus serves for intermittently controlling one or several blink signal lamps, in particular for indicating direction and emitting warning signals. Construction of such an apparatus is determined in particular by the two executed functions, described in the following as "operational modes". These modes are distinct from one another, in particular in the load proportions they place on the directional warning blink sender. Generally, in the directional-blinking operational mode, only a portion of the existing blink signal lamps are driven at a time, since the elected portion, in particular, provides certain information, for example, about the elected direction. In the warning-blinking operational mode, on the other hand, preferably all blink signal lamps are driven in order to make warning blink signals as distinct as possible in addition to making them clearly distinguishable from directional blink signals.

Further demands on the directional and warning blink apparatus, in regard to the different operational modes, result from situations in which these operational modes are used. The directional and warning blink apparatus is used in particular in the warning-blinking operational mode when a car breaks down or after an accident. Particularly after an accident, it is improbable that all blink signal lamps are still functioning. It is an object that the warning blink signal be produced by the remaining functioning blink signal lamps as unvaried as possible. The directional blink signal, on the other hand, is used in normal driving situations and serves to inform other traffic participants about intentions of a vehicle driver. Without this information, in particular due to defective blink signal lamps, accident-prone situations may result. The driver of a vehicle must, therefore, be informed about non-functioning of blink signal lamps. Normally, this is achieved by changing the blink frequency of remaining functioning blink signal lamps, particularly by increasing blink frequency.

In summary, this has led to a requirement that, in the directional-blinking operational mode, failure of only one (preferably) blink signal lamp results in a change in blink signal frequency, while in the warning-blinking operational mode the blink signal frequency remains constant up to a minimal number of functioning blink signal lamps. This specification has become law in some countries, in particular in the United States. According to US requirement, or standard, MVSS 108, blinking in a warning-blinking operational mode must be executed at normal blinking frequencies with two or more functioning blink signal lamps, while in a directional-blinking operational mode, normally a failure of only one blink signal lamp requires an increasing blink signal frequency.

In the US, standard directional and warning blink apparatus have two, three or four blink signal lamps per vehicle side. In an embodiment of the blink apparatus with three blink signal lamps per vehicle side, the above mentioned requirements result in the following problem:

While the directional and warning blink apparatus must indicate failure of one blink signal lamp (that is, reduction from three to two functioning blink signal lamps) by increasing the blink signal frequency in the directional-blinking operational mode, blinking in the warning-blinking operational mode must be executed at normal frequencies, if there are still two functioning blink signal lamps. A similar problem exists for directional and warning blink apparatus with four blink signal lamps per vehicle side when only three or two blink signal lamps are functioning.

Only in Europe does this problem not arise in standard motor vehicles with two blink signal lamps per vehicle side, since in both the warning-blinking and directional-blinking operational mode the blink signal frequency is increased when only one functioning blink signal lamp remains.

German patent document DE-AS 2 153 375 depicts a particularly uncomplicatedly constructed directional and warning blink apparatus. The directional warning blink sender herein is constructed in a two-pole embodiment. The blink signal lamp current timed by the directional warning blink sender is distributed to two blink signal lamp groups with two blink signal lamps each via a directional blink switch and a warning blink switch. If the blink signal frequency of such a directional warning blink sender is constructed to be load-controlled such that, for example, the directional and warning blink apparatus blinks faster with only one controlled directional warning blink signal lamp than with two or more driven blink signal lamps, such an apparatus would fulfill the requirements for a directional and warning blink apparatus with two blink signal lamps per vehicle side. For directional and warning blink apparatus with three or four blink signal lamps per vehicle side the above mentioned requirements certainly cannot be met by such an apparatus, because the directional warning blink sender must receive information about the predetermined operational mode for certain numbers of driven blink signal lamps in order to drive the blink signal lamps at a correct frequency.

Directional and warning blink apparatus comprising several blink senders for executing certain functions have been known for a long time, for example, from prior-art U.S. Pat. No. 3,165,716. Such an apparatus can, for example, be constructed such that it comprises separate warning blink and directional blink senders. These individual blink senders can certainly be constructed such that they fulfill all requirements for the respective operational mode. Such a solution requires very little constructional effort, since a special apparatus is provided for each operational mode which is easily adaptable to any requirements. On the other hand, this solution requires numerous components, therefore being very cost-intensive, since both the directional blink sender and the warning blink sender need individual housings as well as separate driving electronics and individual relays for a minimum requirement. Further, due to little available space in motor vehicles, it may be difficult to find appropriate mounting space for separate directional warning blink senders. Installing one housing for both apparatus is only a partial solution for these problems. The expense for one large housing as compared to that for two smaller ones may be somewhat lower, however, expenses for components and space requirements for mounting the apparatus remain almost unchanged.

A combined directional and warning blink apparatus without the above mentioned disadvantages is available in the directional warning blink sender, type 4DD 006 321-01, as exported to the US since May 1989 by Hella KG Hueck & Co.

Such a directional and warning blink apparatus is depicted schematically in FIG. 6 hereof and will be explained in detail concerning its construction and functions. In this device a single relay controls the blink signal lamps in both operational modes. Therefore, only one blink sender electronic package is required comprising a control and logic circuit, a timing generator and a driving circuit for the relay. It is beneficial that the above mentioned elements are arranged in an integrated circuit having a measuring input terminal on to the control and logic circuit, to which is applied a potential depending upon a blink lamp current. This potential is increased in case of failure of one or several blink signal lamps, thereby enabling the control and logic circuit to recognize such failure, thus causing the timing generator to change its timing operation, for example, by increasing timing frequency.

If it is predetermined by means of the directional and warning blink switches for the operational mode to be warning blinking, the potential at the measuring input terminal is lowered via an additional switch contact of the directional warning blink switch and via a resistor so that the potential stays below a certain threshold value even in case of failure of blink signal lamps, thereby preventing the control and logic circuit from recognizing such failure. In the warning-blinking operational mode, the remaining functioning blink signal lamps are, therefore, driven with normal timing frequency even after failure of one or several blink signal lamps.

This directional and warning blink apparatus thus meets US acceptance requirements in an uncomplicated and cost-effective manner.

The only disadvantage of this directional and warning blink apparatus is that the design layout of the directional and warning blink apparatus almost completely predetermines its external circuits, in particular the number of contacts of its direction and warning blink switch.

The external wiring of directional and warning blink apparatus in motor vehicles are, however, not standardized. They differ, in particular, in the kind and number of switch contacts of the directional and warning blink switch as well as their circuit arrangements with the remaining elements of the directional and warning blink apparatus. The use of the above described directional warning blink senders is, therefore, not possible in all motor vehicles, unless cost- and time-intensive modifications in the electrical arrangement of the motor vehicle are done. In particular in series manufacturing, cost-intensive modifications of pre-molded wiring harnesses may become necessary, wherein the use of such a directional warning blink sender, although generally beneficial, causes additional expenses and often is not used for this reason.

It is an object of this invention to provide a directional and warning blink apparatus having a directional warning blink sender which can be constructed cost-effectively and is easily adaptable to multiple kinds of external wirings.

SUMMARY OF THE INVENTION

According to principles of this invention, the control and logic circuit has at least one further input terminal to which a voltage signal may be applied for detecting the predetermined operational mode of directional or warning blinking.

This further input terminal serves as a start-input terminal for the warning-blinking operational mode upon application of a low potential. Upon a relay being engaged, the control and logic circuit interprets from a potential difference between this further input terminal and the measuring input terminal that the warning-blinking operational mode is activated and that, in case of failure, the timing frequency may not be modified.

There are several options for arranging this further input terminal within the circuit. For one, this input terminal may be coupled to ground via a contact of the warning blink switch thereby allowing construction of directional and warning blink apparatus with external circuits as in state-of-the-art directional and warning blink apparatus. Another particularly advantageous option is to provide in the warning-blinking operational mode a second blink signal lead, switched via a separate relay contact, and therewith to measure the potential of the further input terminal, thereby allowing use of a particularly uncomplicatedly constructed warning blink switch.

BRIEF DESCRIPTION OF THE DRAWINGS

The invention is described and explained in more detail below using the embodiments shown in the drawings. The described and drawn features, in other embodiments of the invention, can be used individually or in preferred combinations. The foregoing and other objects, features and advantages of the invention will be apparent from the following more particular description of a preferred embodiment of the invention, as illustrated in the accompanying drawings in which reference characters refer to the same parts throughout the different views. The drawings are not necessarily to scale, emphasis instead being placed upon illustrating principles of the invention in a clear manner.

DESCRIPTION OF THE PREFERRED EMBODIMENT

Figure 1:
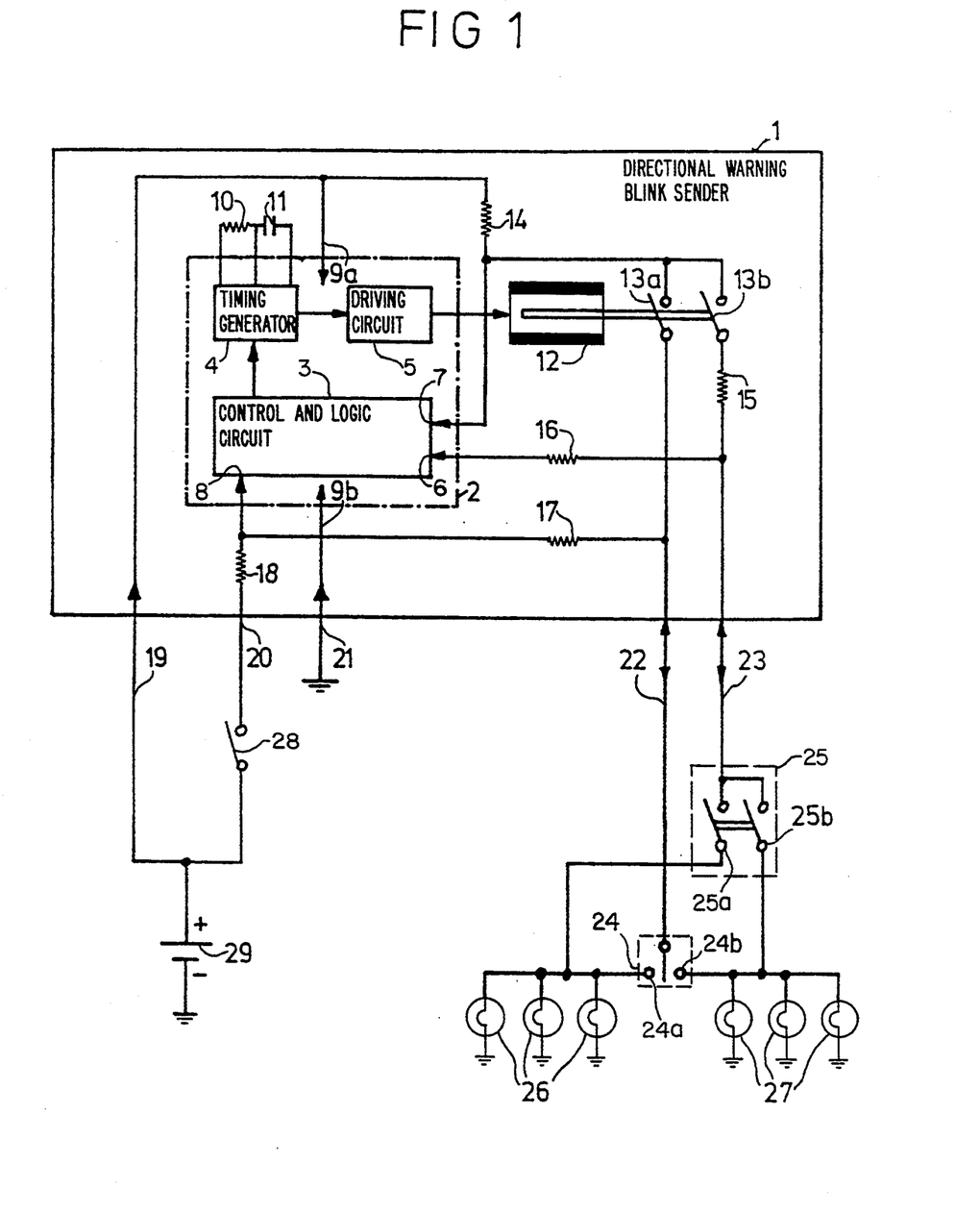
FIG. 1 is a combined block and schematic diagram depicting a first beneficial embodiment of a directional and warning blink apparatus according to this invention.

A beneficial embodiment for a directional and warning blink apparatus of this invention is depicted in FIG. 1. The large rectangle encompasses those components and functional units that are part of the directional warning blink sender 1 and are located within a housing.

Outside of the directional warning blink sender 1 are depicted the parts of a motor vehicle arranged in an external circuit of the directional and warning blink apparatus, namely, a vehicle battery 29, an ignition switch contact 28, a warning blink switch 25 and its contacts 25a, 25b and a direction blink switch 24 with its contacts 24a, 24b. In this embodiment, three blink signal lamps 26 or 27 are arranged on each vehicle side. The inner circuit of the directional warning blink sender 1 comprises a relay 12 with contacts 13a, 13b, and a control and logic circuit 3 driving a timing generator 4 which sends its timing signals to the relay 12 via a driving circuit 5. Signal directions within the circuit diagram are indicated by arrows on the signal leads.

The control and logic circuit 3, the timing generator 4, as well as the driving circuit 5 are combined in an integrated circuit 2. The integrated circuit 2 receives its voltage supply via the voltage supply lead 9a as well as the ground lead 9b, they being respectively coupled to a main voltage supply lead 19 and a main ground lead 21 of the directional warning blink sender 1. Outside of the integrated circuit 2, an RC circuit functioning as a resistor-capacitor combination 10, 11 is provided which is coupled to the timing generator 4.

Further, several resistors 14, 15, 16, 17, 18 are provided within the directional warning blink sender 1, some of which act as protective resistors and some as current voltage convertors.

In the following, operation of the directional and warning blink apparatus of this invention shall be explained by means of the embodiment depicted in FIG. 1.

The directional warning blink sender 1 is constantly coupled to the voltage of the vehicle battery 29 via the main voltage supply lead 19 and the main ground lead 21. If the ignition switch contact 28 is closed, positive potential is applied to a directional-blink, start-input terminal 8 via the resistor 18. If one of the contacts 24a or 24b of the directional blink switch is closed, the directional-blink, start-input terminal 8 is coupled to ground via the blink signal lamp group 26 or 27, the directional blink signal lead 22 and the resistor 17. Thereby, the potential at the directional-blink, start-input terminal 8 is lowered by a certain value. The control and logic circuit 3 interprets this as a start signal for the directional-blinking operational mode and starts the timing generator 4. Thus, the timing generator 4 sends timing pulses to the relay 12 via the driving circuit 5, the timing frequency being determined herein by the resistor 10 and the capacitor 11 as well as by signals from the control and logic circuit 3. The relay 12 first closes the relay contacts 13a, 13b, thereby switching on the selected, driven, blink signal lamp group 26 or 27. By this means, the start signal of the directional-blink, start-input terminal 8 disappears. After a certain period of time, the timing generator 4 switches off the driving signal for the driving circuit 5, thereby deactivating the relay 12. The directional-blink, start-input terminal 8 again receives the directional-blink, start-input signal, thereby starting the next timing cycle.

In a similar manner, the control and logic circuit 3 receives a start signal via a warning-blink, start-input terminal 6 for the warning-blinking operational mode when the warning blink switch 25 is closed.

Timed driving of the relay 12 must be terminated immediately after opening the directional blink switch 24 or the warning blink switch 25. Monitoring as to whether at least one of the blink signal lamp groups 26, 27 is still driven is done by means of the usually very low-ohm precision measuring resistor 14 through which the blink signal lamp current flows in both operational modes. The blink signal lamp current causes a voltage drop at the precision measuring resistor 14 which is analyzed at a measuring input terminal 7 of the integrated circuit 2, for example, by means of a comparator circuit as part of the control and logic circuit 3. As long as there is current flowing through the blink signal lamps 26, 27, the control and logic circuit 3 sends a signal to the timing generator 4. If no reduced voltage and therefore no blink signal lamp current is detected at the measuring input terminal 7, the control and logic circuit 3 immediately stops driving the timing generator 4 or drives it such that the timing generator 4 immediately terminates timing of the relay 12.

Timing signals sent by the control and logic circuit 3 to the timing generator 4 not only switch on and off the timing generator, but also influence its timing frequency, dependent upon the existing operational mode and the number of switched-on blink signal lamps 26 and 27.

It is required that in the directional-blinking operational mode, failure of one or several blink signal lamps 26, 27 lead to an increase of timing frequency, while in the warning-blinking operational mode, failure of blink signal lamps 26, 27 do not cause a change of timing frequency up to a minimal number of functioning blink signal lamps 26, 27.

This causes the following problem in the directional and warning blink apparatus depicted in FIG. 1:

If exactly two blink signal lamps 26, 27 are driven, this must cause a frequency increase in the directional-blinking operational mode (since this means failure of one blink signal lamp), while in the warning-blinking operational mode the frequency should not change. In order to execute predescribed control functions, the control and logic circuit 3 must receive information as to which operational mode is active at any given moment, including during a turn-on phase of the blink signal lamps 26, 27 when no start signal is applied to the start-signal input terminals 6, 8 of the control and logic circuit 3. This is achieved by monitoring the current in the warning blink signal current circuit. For this purpose, the voltage drop at the resistor 15 located in the warning blink signal lead 23 is monitored. The control and logic circuit 3 detects a potential difference between the measuring input terminal 7 and the warning-blink, start-input terminal 6. This voltage difference in the warning-blinking operational mode is always above a certain threshold value and is also distinctly higher with two groups of switched blink signal lamps 26, 27 in the warning-blinking operational mode than in the directional-blinking operational mode. If the control and logic circuit 3 detects a potential difference above the threshold value when the relay contacts 13a, 13b are closed, or if the potential at the directional-blink, start-input terminal 8 is below a value predetermined by the closed ignition switch contact 28 when the relay contacts 13a, 13b are open, the control and logic circuit 3 does not allow a frequency increase but controls the timing generator 4 such that it cycles at normal frequencies.

However, if the measuring input terminal 7 of the control and logic circuit 3 detects a voltage drop at the precision measuring resistor 14, thus indicating a current flowing through the precision resistor which is clearly smaller than a blink signal lamp current for an entire blink signal lamp group 26 or 27, if the potential difference is below the threshold value, and if the potential at the directional-blink, start-input terminal 8 is high (as predetermined by the ignition switch contact 28) when the relay 12 is not activated, the control and logic circuit 3 activates the control function for the directional-blinking operational mode and controls the timing generator 4 such that it drives the relay 12 at double timing frequency.

The control functions may be adapted easily to more than three blink signal lamps per vehicle side. If the vehicle has n blink signal lamps to be controlled per vehicle side, the precision resistor 14 only need be constructed such, since the threshold voltage is predetermined by the control and logic circuit 3, that a voltage drop under a current through n blink signal lamps 26, 27 is larger than the threshold voltage, and under a current through n-1 blink signal lamps 26, 27 is smaller than the threshold voltage.

It presents no problem if a vehicle has two blink signal lamps 26, 27 per vehicle side, since increased blink frequency in the directional-blinking operational mode occurs only when one blink signal lamp is driven, and since in the warning-blinking operational mode, constant blink frequency is required only up to minimally two functioning blink signal lamps 26, 27. Differentiating warning-blinking and directional-blinking operational modes is, therefore, not required in this specific case, thereby allowing a simplified circuit arrangement to be discussed below using another example shown in the drawings.

The suggested directional and warning blink apparatus is, therefore, universally usable and fulfills requirements for vehicles with two or more blink signal lamps per vehicle side, thus being suitable for all US-American as well as European vehicles (with typically two blink signal lamps per vehicle side).

Although this directional and warning blink apparatus for vehicles with only two blink signal lamps per vehicle side may appear to be "overkill", use of this directional and warning blink apparatus is likely to be worthwhile in these cases as well since the universal applicability of this directional and warning blink apparatus allows manufacture of the integrated directional warning blink sender 1 in large quantities and therefore at a low price.

In addition it is possible to adapt the directional warning blink sender 1 of this invention with slight modifications of the inner connections to fit various exterior wiring harnesses without substantial changes to its function. Vehicles are equipped with a wide variety of wiring harnesses, very differently shaped directional-blink and warning-blink switches as well as varying numbers of blink signal lamps.

If it is desired to replace a vehicle's directional and warning blink apparatus with a directional and warning blink apparatus of this invention, particularly by exchanging its directional warning blink sender, it is beneficial to be able to do so without requiring further changes to exterior wiring of the directional warning blink sender. Therefore, the new directional warning blink sender should be easily adaptable to existing exterior wirings and be able to replace the previous blink sender in an improved manner. Thus, it is a particular requirement for the number of terminals of the new directional warning blink sender to be the same as the number of terminals of the existing directional warning blink sender.

FIGS. 2-5 depict variations of the directional and warning blink apparatus of this invention. Since their operation corresponds substantially with that of the embodiment in FIG. 1, only the differences to the directional and warning blink apparatus depicted in FIG. 1 shall be explained.

Although the following embodiments (except for one) require fewer contact terminals, all five contact terminals of the embodiment depicted in FIG. 1 are marked for better comparison. The contact terminals depicted as deactivated in the following are unimportant for the respective function and can, therefore, be omitted.

Figure 2:
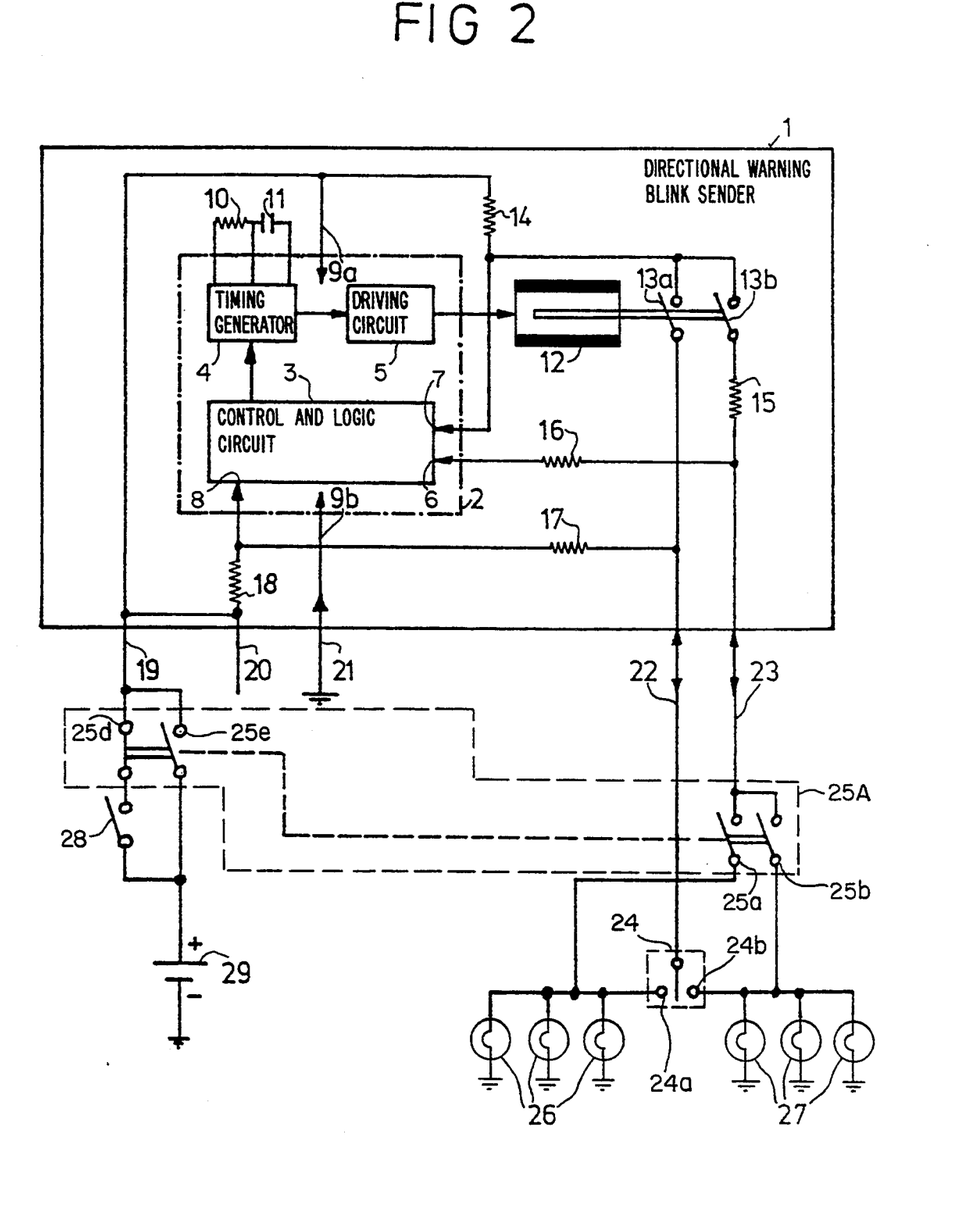
FIG. 2 is a combined block and schematic diagram depicting a second beneficial embodiment of the directional and warning blink apparatus according to this invention.

If the motor vehicle is provided with a warning blink switch 25A with three contacts for engaging terminals 25a, 25b, 25e and one contact for disengaging terminal 25d, the directional and warning blink apparatus of this invention can be constructed according to the embodiment depicted in FIG. 2, for example.

In the warning-blinking operational mode, the engaging contacts 25a, 25b, 25e of the warning blink switch 25A are closed. The warning blink switch contact 25e bridges herein the ignition switch contact 28 so that the directional warning blink sender 1 is supplied with voltage from the vehicle battery 29 via the main voltage supply lead 19, independently of the switching status of the ignition switch contact 28. Due to the particular construction of the warning blink switch 25A, especially the flip-switch contacts 25d, 25e, it is impossible to engage the directional-blinking operational mode while the ignition switch contact 28 is open. If only one blink signal lamp group 26 or 27 is to be driven via the directional blink signal lead 22, the warning blink switch contacts 25a, 25b and thus also contact 25e must be open. Thus, voltage can only be supplied to the directional warning blink sender 1 via the closed contact 25d arranged in series with the ignition switch contact 28. Directional blinking is, therefore, possible only when the ignition is switched on, while warning blinking, as usual, is independent of the position of the ignition switch contact 28, resulting in a benefit of not needing the ignition control lead 20 as well as its matching contact at the directional warning blink sender 1. In order to produce a potential at the directional-blink, start-input terminal 8 required for the directional blinking impulse in the operational mode, the directional-blink, start-input terminal 8 is continuously coupled to the main voltage supply lead 19 via the resistor 18.

Figure 3:
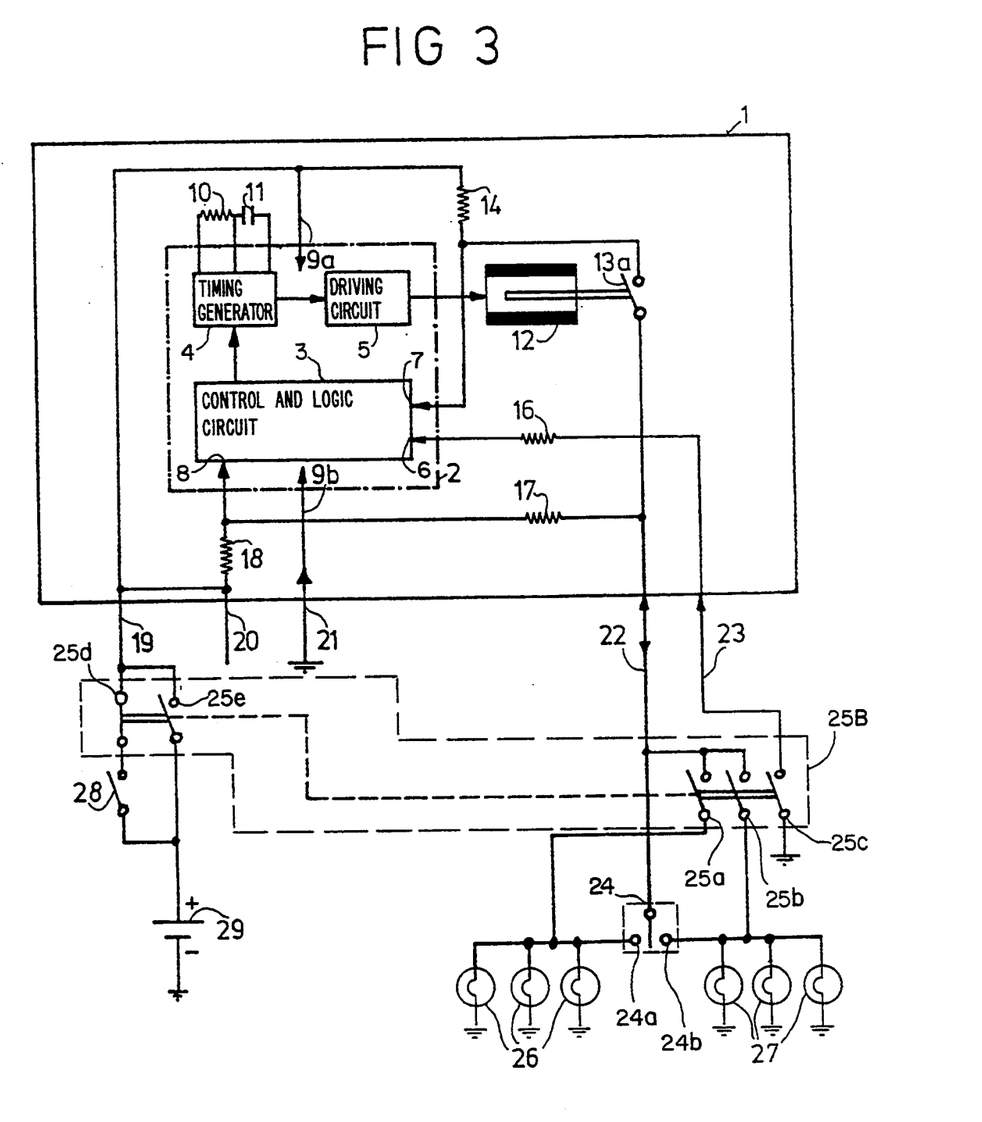
FIG. 3 is a combined block and schematic diagram depicting a third beneficial embodiment of the directional and warning blink apparatus according to this invention.

The embodiment depicted in FIG. 3 shows similarly constructed flip-switch contacts 25d, 25e at a warning blink switch 25B. The warning blink switch 25B, however, has an additional starting contact 25c compared to the embodiment depicted in FIG. 2. The warning-blink, start-input terminal 6 is coupled to ground, when the warning blink switch 25B is closed, via the resistor 16 and the warning blink switch contact 25c, thereby continuously receiving constantly the required warning-blink, start-input signal. At the same time, a potential at the warning-blink, start-input terminal 6 is produced so that with two or more controlled blink signal lamps a potential difference occurs between the measuring input terminal 7 and the warning-blink, start-input terminal 6 above the threshold voltage US below which the control and logic circuit 3 causes the timing generator 4 to increase the frequency. This embodiment has one common blink signal lead 22 for both directional as well as warning operational modes. The particular benefit of this embodiment compared to the ones depicted in FIGS. 1 and 2 is that the directional warning blink sender 1 can be equipped with a particularly uncomplicated and cost-effective relay 12 (one that has only one closing contact 13a).

Figure 4:
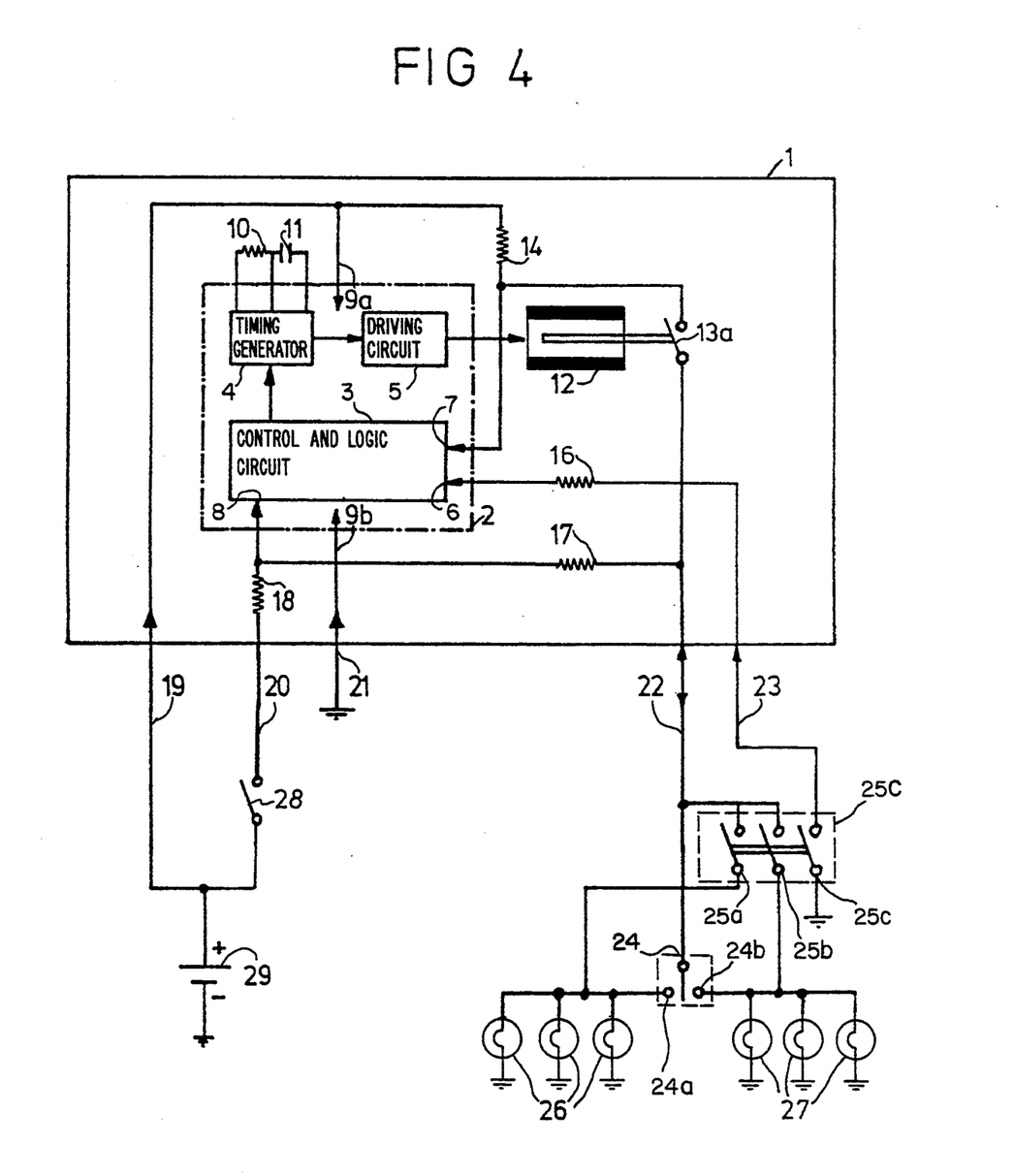
FIG. 4 is a combined block and schematic diagram depicting a fourth beneficial embodiment of the directional and warning blink apparatus according to this invention.

The embodiment depicted in FIG. 4 also has the above-mentioned benefit. This embodiment has, in addition to this particularly uncomplicated and cost-effective relay 12, also an even more uncomplicated warning blink switch 25C than the embodiments in FIGS. 2 and 3. Activating the warning-blinking operational mode and driving the blink signal lamps 26, 27 is done as in the embodiment depicted in FIG. 3. Detecting the directional-blinking operational mode is done here as in FIG. 1 via an ignition voltage control lead 20, while the flip-switch contacts 25d and 25e of FIGS. 2 and 3 are not required in this embodiment. At the same time, the number of required leads for wiring the directional warning blink sender 1, the warning blink switch 25C, the ignition switch contact 28 and the vehicle battery 29 is reduced compared to the above-mentioned embodiments, thereby saving further costs.

Figure 5:
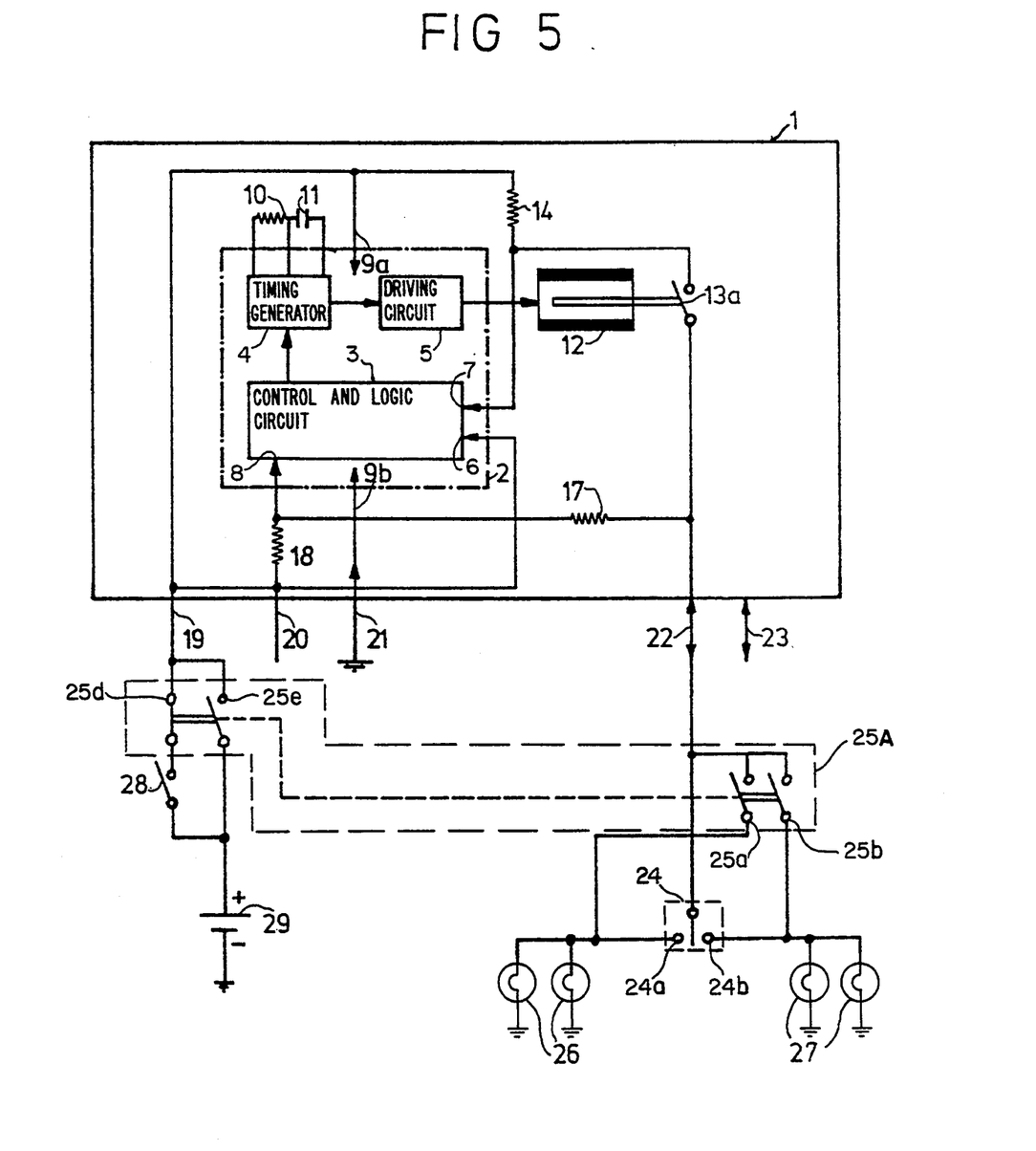
FIG. 5 is a combined block and schematic diagram depicting a fifth beneficial embodiment of the directional and warning blink apparatus according to this invention.

A further, especially uncomplicated variation of the directional and warning blink apparatus of this invention is depicted in FIG. 5 and is particularly applicable for vehicles with two blink signal lamps 26, 27 per vehicle side. Since such vehicles for two controlled blink signal lamps 26, 27 are required to blink at normal frequency in both directional blinking as well as warning blinking operational modes, and with less than two controlled blink signal lamps 26, 27 must blink at an increased blink frequency in the directional-blinking operational mode and may blink faster in the warning-blinking operational mode, the directional warning blink sender 1 meets, in this case, US as well as European requirements.

Such a directional warning blink sender 1 can therefore be constructed with only three contacts. In addition to the main ground lead 21 and the main voltage supply lead 19, which is coupled in the above-described manner to the vehicle battery 29 via the warning blink switch contacts 25d, 25e or to the ignition switch contact 28 for allowing directional blinking only while the ignition is closed, the blink signal lead 22 serves as output lead for warning and directional blinking and as start-input lead for both operational modes. When the warning blink switch 25A or the directional blink switch 24 are engaged, a start signal is transmitted via the resistor 17 to the directional-blink, start-input terminal 8 of the control and logic circuit 3.

It is important that the warning-blink, start-input terminal 6 be coupled to the voltage supply lead 19, that is, firmly connected to a positive potential. Thus, the potential at the warning-blink, start-input terminal 6 is always higher than the potential at the measuring input terminal 7 so that the control and logic circuit 3 never detects the presence of the warning-blinking operational mode, thereby allowing directional as well as warning blinking in the warning-blinking operational mode. Such a directional warning blink sender 1 offers the benefit of requiring only three terminals 19, 21, 22. Directional blink signals as well as warning blink signals are transmitted via one individual blink signal lead 22, thereby requiring only one relay 12 with an uncomplicated relay closing contact 13a. Even the resistor 16 is not needed.

Figure 6:
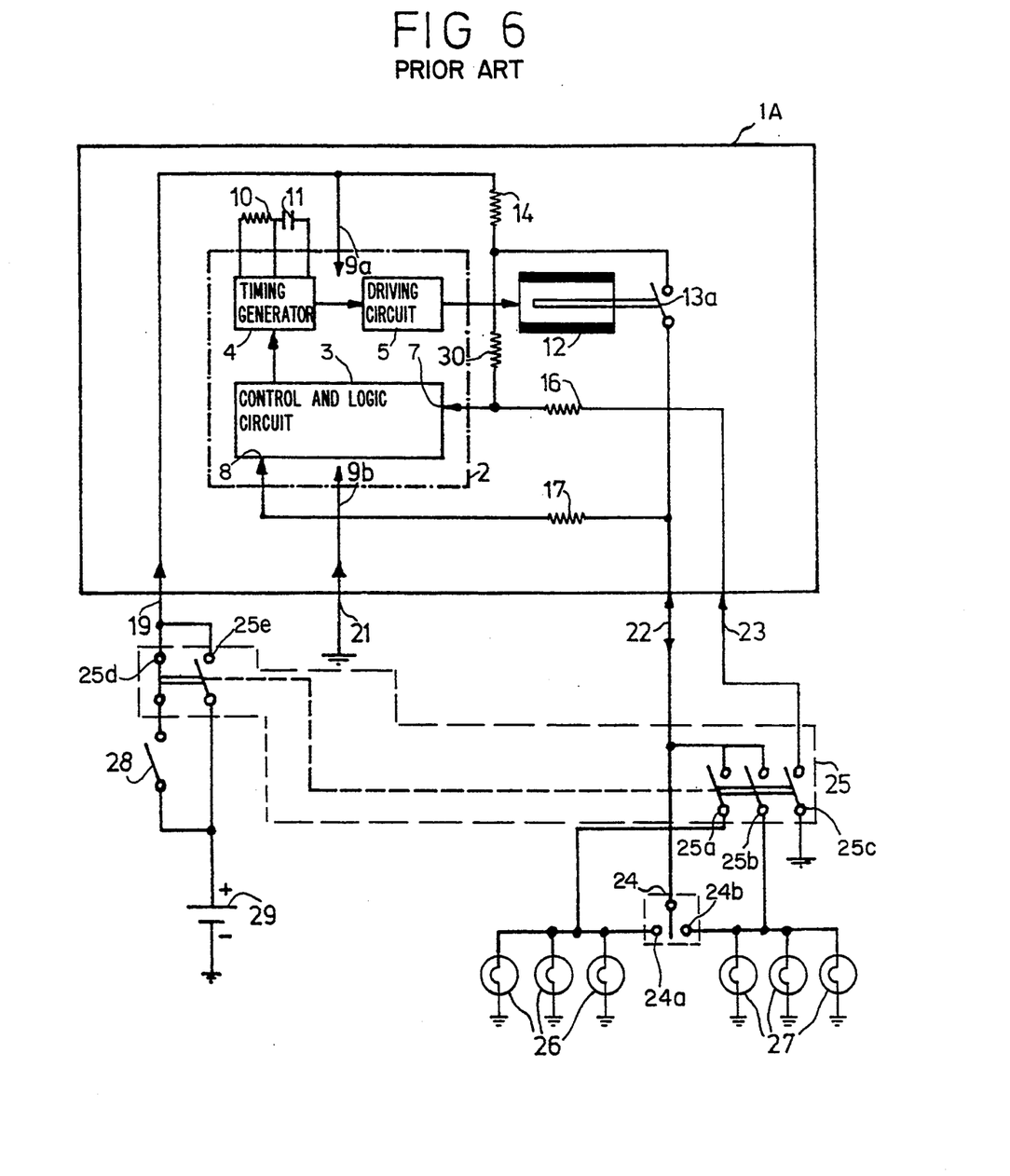
FIG. 6 depicts a prior-art directional and warning blink apparatus.

FIG. 6 depicts a prior-art directional warning blink apparatus corresponding in function and exterior wiring to the directional and warning blink apparatus depicted in FIG. 3.

However, in the directional warning blink sender 1A depicted in FIG. 6, the control and logic circuit 3 does not have a further input terminal 6 so that ground potential is transmitted to the measuring input terminal 7 via the lead 23 and the resistor 16 when the warning blink switch contact 25c is closed.

When the directional blink switch 24 or the warning blink switch 25 are closed, the input terminal 8 of the control and logic circuit 3 receives a starting signal for driving the timing generator 4. Similarly to the embodiment depicted in Fig 3, a potential, dependent upon the blink signal lamp current, is measured at the precision measuring resistor 14. This potential is transmitted to the measuring input terminal 7 via the resistor 30.

If in the directional-blinking operational mode, that is, when the directional blink switch 24 is engaged, one or several of the driven blink signal lamps 26, 27 has failed, the potential at the measuring input terminal 7 increases. If this potential exceeds a certain value predetermined within the control and logic circuit 3, the control and logic circuit 3 detects therein that at least one of the blink signal lamps 26, 27 is not functioning and causes the timing generator 4 to change its timing operation.

However, in the warning-blinking operational mode, the potential is lowered at the measuring input terminal 7 via the closed grounded warning blink switch contact 25c, the lead 23 and the resistor 16. Thereby, the potential at the measuring input terminal 7 does not reach, even in case of failure of several blink signal lamps 26, 27, the threshold value above which the control and logic circuit 3 causes a frequency increase by the timing generator 4. In short, the control and logic circuit 3 does not detect a lamp failure in the warning-blinking operational mode.

The features required by the inspection requirements are thus achieved in this very uncomplicated manner. It is a disadvantage that the depicted directional warning blink sender 1A is very inflexible regarding its exterior wiring. This applies also to the switch combination 25d, 25e, 28 for blocking the directional-blinking operational mode when the ignition is switched off which may hardly be constructed differently since the start-input terminal 8 is not intended as a logic input terminal for monitoring the switch status of the ignition switch 28.

As can be seen from the embodiments depicted in FIGS. 1-5, the directional and warning blink apparatus of this invention is in contrast almost universally usable. Observing current requirements in the US as well as in European countries, the embodiment of the directional and warning blink apparatus may be easily adapted to the exterior wiring (varying blink signal lamp numbers, various wiring harnesses, various warning blink switches) for various vehicle types, thereby providing a particularly cost-effective solution in each case. Therefore, the interior wiring of the directional warning blink sender requires only a very low number of components. The central component is herein an integrated circuit comprising the control and logic circuit 3, the timing generator 4 and the driving circuit 5. Its universal applicability and uncomplicated adaptability also to technically less demanding directional and warning blink apparatus with two blink signal lamps per vehicle side allow manufacture of the integrated circuit in large quantities, thus permitting particularly cost-effective manufacture of the directional warning blink sender 1.

As demonstrated in the various embodiments, a particular advantage of the directional and warning blink apparatus of this invention is the almost universal applicability of the directional warning blink sender, that is, the directional warning blink sender can be adapted, by minor modifications to interior wirings, to various external wirings in a very beneficial manner. The various beneficial embodiments of the directional warning blink sender, described in the examples, herein provide a particularly cost-effective directional and warning blink apparatus according to this invention for predetermined external wirings.

The directional and warning blink apparatus of this invention has only one relay which is integrated into the directional warning blink sender. By integrating the control and logic circuit, the driving circuit and the timing generator into an integrated circuit, the directional warning blink sender may be constructed in a particularly uncomplicated and cost-effective manner as well as to be small. In addition to the integrated circuit, only few further components are required.

In order to keep the number of leads to the directional warning blink sender to a minimum, at least one of the input terminals of the control and logic circuit is coupled to one of the blink signal output terminals.

A further advantage of the directional and warning blink apparatus of this invention is that independently of the configuration of the warning blink switch, directional blinking, that is, the driving of a single blink signal lamp group, is not possible if the ignition switch contact is open. This is either prevented by a flip-switch contact at the warning blink switch or by monitoring the potential at the ignition switch contact via one of the start-input terminals. Herein, the latter alternative offers the advantage of allowing the use of a particularly uncomplicated warning blink switch.

Executing this function via an additional relay coupled to an ignition switch contact wherein contacts of the relay couple the blink sender and the directional blink switch is not required in any case, thereby saving expense and space requirements for this relay.

The embodiments of the invention in which an exclusive property or privilege are claimed and defined as follows:

1. A directional and warning blink apparatus for a vehicle, in particular a motor vehicle, comprising two groups of blink-signal lamps, a directional-blink switch for selecting a blink-signal lamp group, a warning-blink switch for combined switching of both blink-signal lamp groups, a directional warning blink sender including a relay for controlling the blink-signal lamps, a timing generator for producing timing signals, a driving circuit for controlling the relay corresponding to the timing signals of the timing generator, and a control and logic circuit means having a measuring input terminal to which is applied a voltage signal proportionate to a blink-signal lamp current, and for controlling the timing operation of the timing generator depending upon said voltage signal, wherein the control and logic circuit means has separate start-input terminals, one coupled to a circuit for receiving a voltage signal from the directional-blink switch and the other coupled to a circuit for receiving a voltage signal from the warning-blink switch, for starting the timing generator in response to said voltage signals, said voltage signals informing the control and logic circuit means of one of a switched directional-blinking or warning-blinking mode of operation of the lamps, said control and logic circuit means including a means for responding to the voltage signals applied to said start-input terminals by causing the timing generator in the warning-blinking mode of operation to produce predetermined first timing signals, if two or more blink-signal lamps are functioning, and in the directional-blinking mode of operation to produce second timing signals, different from the first timing signals, if the controlled blink-signal lamp group has one or more non-functioning blink-signal lamps.

2. A directional and warning blink apparatus as in claim 1 wherein at least one of the start-input terminals is also coupled to an ignition switch for detecting a switch mode of the ignition switch.

3. A directional and warning blink apparatus as in claim 1 wherein the control and logic circuit means, the timing generator and the driving circuit are combined in an integrated circuit.

4. A directional and warning blink apparatus as in claim 1 wherein said apparatus has only one relay.

5. A directional and warning blink apparatus as in claim 1 wherein each blink signal lamp group comprises more than two blink signal lamps.

6. A directional and warning blink apparatus as in claim 1 wherein each blink signal lamp group consists of only two blink signal lamps.

7. A directional and warning blink apparatus as in claim 1 wherein the control and logic circuit means determines the number of blink-signal lamps functioning, and therefore switches the timing generator to respectively produce said first and second timing signals, dependent upon the blink signal lamp current magnitude.

8. A directional and warning blink apparatus as in claim 1 wherein the control and logic circuit means controls the timing generator so that its timing frequency depends upon the switched mode of operation and upon the blink signal lamp current magnitude so as to produce said first and second timing signals.

9. A directional and warning blink apparatus as in claim 1 wherein the control and logic circuit means prevents the timing generator from being activated if a start signal is not applied to at least one of the two start-input terminals.

10. A directional and warning blink apparatus as in claim 1 wherein at least one of the start-input terminals is coupled to a blink signal lead.

11. A directional and warning blink apparatus as in claim 1 wherein when the relay is activated, the control and logic circuit means interprets a potential difference between the measuring input terminal and start-input terminal for detecting a predetermined operational mode.

12. A directional and warning blink apparatus as in claim 1 wherein when the relay is not activated, the control and logic circuit means interprets the potential at start-input terminal for detecting an operational mode.

13. A directional and warning blink apparatus as in claim 1 wherein in the directional-blinking operational mode the control and logic circuit means includes a means for causing the timing generator to increase a frequency if at least one of the controlled blink-signal lamps is not functioning.

14. A directional and warning blink apparatus as in claim 13 wherein the timing generator includes a means for doubling the timing frequency in response to activation by said means for causing timing generator to increase frequency.

15. A directional and warning blink apparatus as in claim 13 wherein, in the warning-blinking operational mode, said means for causing said timing generator to increase frequency does not increase the timing frequency of the timing generator as long as a minimum number of blink signal lamps are functioning.

16. A directional and warning blink apparatus as in claim 15 wherein in the warning-blinking operational mode the control and logic circuit means does not increase the timing frequency of the timing generator as long as at least two blink-signal lamps are functioning.

17. A directional and warning blink apparatus as in claim 1 wherein the control and logic circuit means includes a means for recognizing the non-functioning of one or several blinking-signal lamps by a decrease of potential at the measuring input terminal below a threshold value if the relay is activated.

18. A directional and warning blink apparatus as in claim 1 wherein the directional warning blink sender is continuously coupled to a vehicle battery.

19. A directional and warning blink apparatus as in claim 1 wherein the directional warning blink sender includes a means for controlling only individual blinking signal lamp groups if an ignition switch is closed.

20. A directional and warning blink apparatus as in claim 19 wherein an ignition switch contact is arranged in series with a switch-off contact of the warning blink switch.

21. A directional and warning blink apparatus as in claim 19 wherein a potential of a closed ignition switch is applied to one of said input terminals and the control and logic circuit means includes a means for preventing it from responding to a directional blink start signal without said potential.

* * * * *